United States Patent Office 3,011,594
Patented Dec. 5, 1961

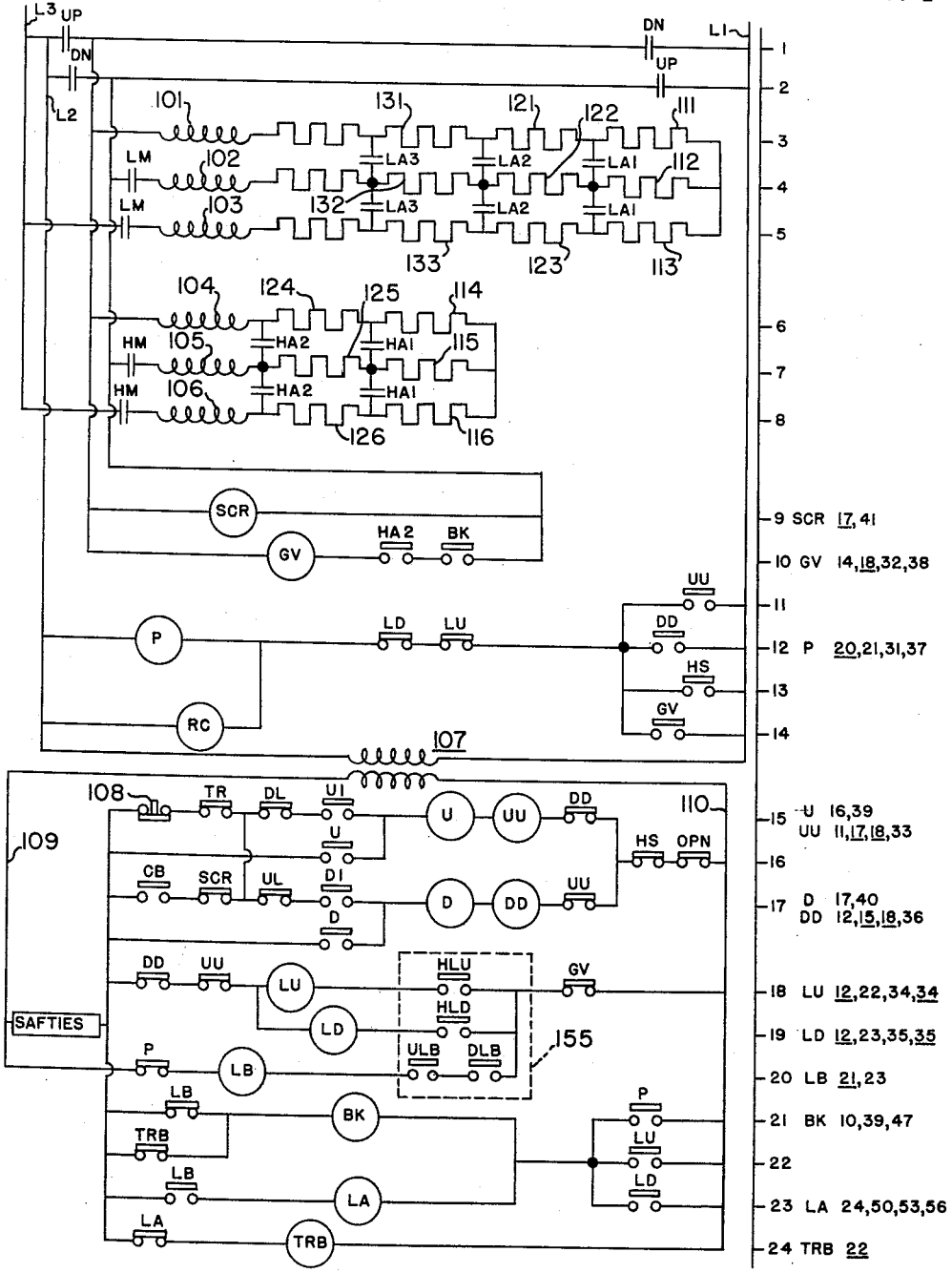
Fig. I

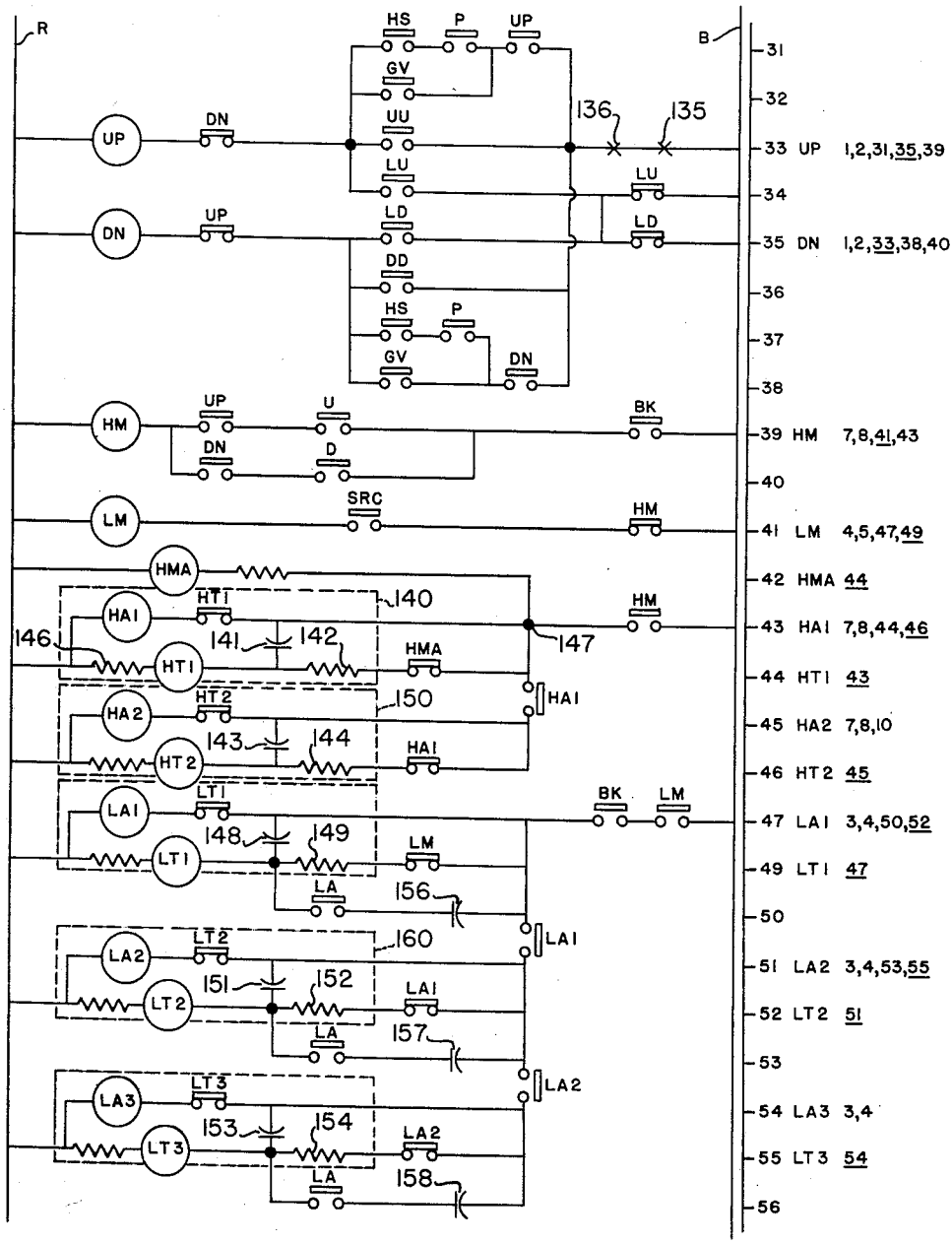
Fig. II

3,011,594
ELEVATOR CONTROLS
Joseph H. Borden, Toledo, Ohio, assignor to Toledo Scale Corporation, Toledo, Ohio, a corporation of Ohio
Filed June 6, 1960, Ser. No. 34,073
9 Claims. (Cl. 187—29)

This invention relates to elevator controls and more particularly to the controls for smoothing the transitions in starting and stopping elevator motors of the alternating current type.

Alternating current motors are frequently used to drive elevator cars. Squirrel cage type motors having their windings arranged for several connections so that they can be provided with two or more different numbers of poles are employed such that these motors have several synchronous speeds. For example, on a sixty cycle circuit a motor can be arranged with twenty-four and six poles so that the twenty-four pole arrangement of the windings provides a motor synchronous speed of 300 r.p.m., and the six pole arrangement provides a synchronous speed of 1,200 r.p.m. Motors of this type are started using the high speed grouping of windings with resistance in series with the windings to reduce the initial application of torque so that the elevator car which it drives is not accelerated at an uncomfortably rapid rate. As the motor accelerates the resistance in series with its stator windings is reduced to increase its torque and ultimately bring it up to synchronous speed. In stopping these motors the arrangement of effective windings is such so that the stator presents a greater number of poles and the synchronous speed is reduced. Again in order to avoid too abrupt a transition in speed due to the dynamic braking afforded by the sudden increase in the number of poles and reduction in synchronous speed the torque of the motor is initially established at a low value by connecting the stator windings with resistance in series therewith and by reducing that resistance as the motor approaches the new synchronous speed. The reduction of this resistance increases the dynamic breaking of the elevator and gradually brings it to synchronous speed from which it is stopped by the application of a brake which is permitted to slip to some degree during the transition from the slow synchronous speed to the stopped condition.

The control of the torque reducing resistances in these stator winding circuits has been effected by means of motor driven switches. Frequently a polyphase torque motor is utilized for this purpose. Such motors and their associated switches are extremely bulky and are expensive. The present invention involves the control of two speed squirrel cage type motors by means of electromagnetic relays of simple construction which are compact, relatively inexpensive and readily adjusted to afford the timing intervals required in proper motor operation. These relays can be made extremely rapid in response where desired and yet offer a substantial interval over which their operation can be adjusted.

Releveling of an elevator, as where it overruns a landing at which it is stopped or where it shifts its position with changes in loading, is accomplished through the low speed windings of the motor. Since only small adjustments in position are required, the low speed torque is applied initially at its minimum level and if leveling has not been accomplished after an interval sufficient to effect releveling the torque is increased. The windings and circuits employed in decelerating from high speed are utilized in releveling, however their timing sequences are altered so that the steps in increasing torque are made more slowly. In practice the steps can be made at intervals of a fraction of a second in stopping a car, and at intervals of the order of a second in releveling.

One object of this invention is to improve the control of alternating current squirrel cage type motors.

Another object is to reduce the expense of controllers for alternating current motors.

A further object is to increase the flexibility of adjustment available for alternating current type motors.

The above and other objects and features of this invention will be more fully appreciated from the following detailed description when read with reference to the accompanying drawings in which:

FIG. I is an across-the-line diagram of the alternating current circuits for an elevator having a two speed, squirrel cage type, lifting motor including the controls which function in the starting and stopping of that motor; and FIG. II is an across-the-line diagram of the direct current supplied sections of an elevator motor control circuit which cooperates with FIG. I in the accelerating and decelerating of a squirrel cage type motor.

Many of the control circuits for an elevator of the type to which the controls of the present invention are applicable have been deleted from the disclosure of this invention. No door controlling circuits, no landing and car call circuits and no circuits for interrelating the operation of one elevator with another in a bank are shown here. For purposes of this invention the elevator system to which it is applied can be considered to be that for a single car serving two or more landings, inasmuch as the invention concerns itself with starting and stopping the elevator lifting motor in a manner which avoids the discomfort of abrupt transitions in speed.

In order to simplify the reading of the circuit diagrams they have been presented in across-the-line form wherein the actuating coils of the switches, relays and timers are not physically related with the contacts they actuate. Instead, the diagrams are divided into horizontal zones or bands which are identified by line numbers; lines 1–24 appearing in FIG. I and lines 31–56 appearing in FIG. II. Each actuating coil is indexed in the right-hand margin of the drawing adjacent the zone number in which it appears and in horizontal alignment with its representation in the drawing. To the right of the reference character for that actuating coil are the zone numbers for the contacts of that coil. Back contacts, those normally closed and opened when the actuating means is energized are shown underline. Thus at line 9 of FIG. I the reference character SCR for the signal control relay is indexed with the number 17 underlined and at line 17 in FIG. I a normally closed SCR contact is found in series with a normally open CB contact. Front contacts, those which are normally opened and are closed when their actuating means is energized, are also indexed by their line number. Thus an SCR front contact appearing at line 41 of FIG. II is indexed at 41 at line 9 of FIG. I. The several contacts are shown in the circuits in the position they assume when their energizing means are deenergized and have been reset.

In order to facilitate an understanding of the circuits the several switches and relays shown with their actuating coils are listed below by their reference characters in alphabetical order with a short name applied to those switches or relays and the location of their actuating coils recited.

| Symbol | Name | Location |
|---|---|---|
| BK | Brake Relay | 21 |
| D | Down Direction Relay | 17 |
| DD | do | 17 |
| DN | Down Direction Switch | 35 |
| GV | Governor Relay | 10 |
| HA1 | First High Acceleration Switch | 43 |
| HA2 | Second High Acceleration Switch | 45 |
| HM | High Main Switch | 39 |
| HMA | Auxiliary High Main Switch Relay | 42 |
| HT1 | First High Acceleration Pilot Relay | 44 |
| HT2 | Second High Acceleration Pilot Relay | 46 |
| LA | Auxiliary Leveling Relay | 23 |
| LA1 | First Low Acceleration Switch | 47 |
| LA2 | Second Low Acceleration Switch | 51 |
| LA3 | Third Low Acceleration Switch | 54 |
| LB | Leveling Brake Relay | 20 |
| LD | Down Leveling Relay | 19 |
| LM | Low Main Switch | 41 |
| LT1 | First Low Acceleration Pilot Relay | 49 |
| LT2 | Second Low Acceleration Pilot Relay | 52 |
| LT3 | Third Low Acceleration Pilot Relay | 55 |
| LU | Up Leveling Relay | 18 |
| P | Leveling Control Relay | 12 |
| RC | Retiring Cam Relay | 14 |
| SCR | Signal Control Relay | 9 |
| TRB | Brake Timing Relay | 24 |
| U | Up Direction Relay | 15 |
| UP | Up Direction Switch | 33 |
| UU | Up Direction Relay | 15 |

There are also contacts shown in the circuits of FIGS. I and II for which the actuating coils have not been depicted. These include, as set forth alphabetically:

| Symbol | Name |
|---|---|
| CB | Car Button Relay. |
| DL | Down Direction Locking Relay. |
| D1 | Instantaneous Direction Relay. |
| HS | Slow Down Relay. |
| TR | Starting Time Relay. |
| UL | Up Direction Locking Relay. |
| U1 | Up Instantaneous Direction Relay. |

Three supply leads from a suitable source of three phase alternating current, leads, L1, L2 and L3 are shown in FIG. I. These leads are connected through suitable direction determining switch contacts UP and DN at lines 1 and 2 to low speed stator windings 101, 102 and 103 of a squirrel cage type, elevator lifting motor and to high speed stator windings 104, 105 and 106 of that motor. The low speed windings are connected to the supply leads by low main switch contacts LM at 4 and 5 through series resistance including first step resistors 111, 112 and 113, second step resistors 121, 122 and 123, and third step resistors 131, 132 and 133, each of which is successively shorted out during the transition from the high synchronous speed of windings 104, 105 and 106 to the low synchronous speed of windings 101, 102 and 103 as the retarding torque of the low speed windings is gradually applied to reduce the speed to the low synchronous speed. These circuits also are completed to move the car to a position level with a landing when the car is stopped in a leveling zone adjacent the landing but displaced from true level. The first step in this transition is effected by the closing of contacts LA1 of the first low acceleration switch. The second group of relays is shorted out by the second low acceleration switch contacts LA2 at lines 4 and 5 and the third resistors are shorted out by contacts LA3 at 4 and 5 of the third low acceleration switch.

The high speed windings of the stator are connected in circuit by the contacts of high main switch HM at lines 7 and 8 upon the starting of the elevator and are maintained so connected throughout the normal running of the elevator. Upon starting, the torque reducing resistances 114, 115 and 116 of the first step of acceleration are in circuit with the second torque reducing resistances 124, 125 and 126. As the motor is started, first high acceleration switch contacts HA1 at lines 7 and 8 close to short out the first step of resistance and after another interval second high acceleration switch contacts HA2 at lines 7 and 8 are closed to short out the second step resistances.

Signal control relay SCR at 9 is energized so long as a direction switch is closed at lines 1 and 2 while governor relay GV at 10 requires, in addition to the closed direction switch, the energization of brake relay BK to close its contact at 10 and the completion of the second step in acceleration for high speed operation to close contact HA2 at 10.

The energizing circuit for leveling control relay P, retiring cam relay RC and transformer 107 feeding the other alternating current controls depicted is completed so long as power is supplied to the lines L1 and L2. Relays P and RC are energized in starting when the direction of starting is determined to close either up direction relay contact UU at 11 or down direction relay contact DD at line 12 and are maintained energized during running of the car by those relays until the slow down operation is initiated by relay HS, closing contact HS at 13. Relay HS is reset in the stopping operation. However, the relays P and RC remain energized until the brake is set and governor relay GV drops out to open its contact at 14.

Most of the circuits in the lower portion of FIG. I supplied from the secondary of transformer 107 are connected behind the safeties including governor switches and limit switches in the elevator hatchway. When all of these safeties are made up the circuits are effective to permit the running of the car. The direction a car runs is determined by the up direction relays U and UU at 15 and the down direction relays D and DD at 17. When the car stops with another call in registration, these relays are pulled in after a suitable stopping interval as determined by the slow dropout of starting time relay TR having a contact at 15. Door hold button 108 is provided in that circuit to retard the effect of the operation of TR. Direction locking relays DL and UL and up and down instantaneous direction relays U1 and D1 (all not shown) determine the direction in which the car will start away from a landing by sensing the relative position of calls in the system with respect to the car, all in a manner well known. Contacts DD and UU at 15 and 17 are interlocks to avoid having both sets of direction relays energized at the same time. Back contact HS at 16 drops out the direction relays as the stopping sequence for the car is initiated and door open relay contact OPN at 16 prevents the establishment of the direction relay circuits until the doors are virtually closed in restarting a car. A car call can also start the car through the closure of car call relay contact CB at 17 to energize the direction relays when the car has no direction set and signal control relay SRC is deenergized to close its back contact at 17.

Relays LU, LD and LB function in the final stopping of a car level with a landing and are controlled by a leveling unit, shown enclosed in dashed lines, including switches HLU, HLD, ULB and DLB all mounted on the car and arranged to be closed when the car is at predetermined positions in the hatchway spaced from the landing. These leveling relays are effective only after the direction relays have been disabled to dropout DD and UU in the case of the course leveling relays LU and LD and only after the relay P has dropped out in the case of final leveling relay LB.

The brake relay BK at 21 controls the elevator brake, that brake normally being of the type which is set by spring pressure and is released by a solenoid which is energized when brake relay is energized. Thus the deenergization of brake relay BK applies the brake. This deenergization is effected when the car is positioned adjacent a landing such that both contacts HLU at 18 and HLD at 19 are open to open contacts LU and LD at 22 and 23. Auxiliary leveling relay LA at 23 is also responsive to these LU and LD contacts and is dropped out at the instant of final leveling by the opening of both of these contacts. Brake timing relay TRB times out a given interval after leveling relay LA is deenergized if the car has been positioned accurately at the landing as sensed by the leveling units. The purpose of relay TRB is to release the brake in the event that the car has stopped short of the landing or has overshot the landing and is required to relevel since it closes the contact at line 22 in the brake energizing circuit so that that circuit is completed if either of leveling relays LU or LD close their contacts at 22 and 23 indicating that the car has not leveled properly.

In FIG. II up and down direction switches UP and DN at 33 and 35 are energized when the direction is established by direction relays UU or DD in starting a car and whenever releveling is necessary as where one of the leveling relays LU or LD is energized to close its contact at 34 or 35. These relays remain energized through a seal circuit including the parallel contacts HS of the slow down relay and GV of the governor relay in series with the sealing contacts UP for up switch and DN for the down switch.

High main switch HM at 39 is energized when the direction is established, the direction switches are actuated and the brake is released to close contact BK at 39. This switch in turn energizes the high main windings of the stator for the lifting motor as described for FIG. I. Low main switch LM at 41 is energized while direction is set to energize signal control relay SCR and high main switch is deenergized to close its back contact at line 41. Auxiliary high main switch HMA relays the operation of HM upon closure of contact of HM at 43.

The remainder of FIG. II depicts the circuits for the acceleration switches and acceleration pilot relays. The combination of switch, pilot relay, timing condenser, and discharge resistor enclosed in a dashed line rectangle constitutes a motor torque timing unit 140. A typical pilot relay and switch operation will be discussed and further discussion of individual switches and relays will be deferred until a description of a detailed operation of the system is undertaken. When the high main switch is energized to close contact HM at 43, acceleration pilot relay HT1 rapidly pulls in due to the flow of current through capacitor 141. HT1 therefore opens its contact at 43 to prevent the energization of the first high acceleration switch HA1 which is slower to respond to the closure of contact HM than is the acceleration pilot relay. Back contact HMA at 44 is opened since relay HMA at 42 is energized by closure of contact HM at 43. During the flow of the transient charging current, acceleration pilot relay HT1 remains pulled in. However, after a suitable interval ordinarily of the order of a second, the current flowing to charge capacitor 141 falls to a value insufficient to hold the pilot relay HT1 pulled in and that relay drops out closing its contact 43 to permit the energization of switch HA1. HA1 then pulls in to short out the first step of resistance in series with the high speed windings 104, 105 and 106 and closes its contact at 44 while opening its contact at 46 to initiate a timing cycle in acceleration pilot relay HT2 for acceleration switch HA2. Again, as HT2 times out due to the charging of condenser 143 contact HT2 at 45 closes to permit energization of the acceleration switch HA2.

Accurate timing by the pilot relay is essential to high quality elevator service. Under some circumstances timing cycles are initiated shortly after the pilot relay timing circuits are open and before the timing condensers are discharged. This is particularly true of the low speed controls as employed in releveling the elevator. Accurate timing is realized by fully discharging the timing condenser almost instantaneously as through the relatively low resistance 142 which is connected across the condenser 141 by the closing of back contact HMA at 44. Relay HMA drops out with the opening of contact HM at 43. Similarly, condenser 143 is shunted by low discharging resistance 144 upon the drop of switch HA1 and the closing of its contact at 46.

A typical operation of an elevator through the control of this invention will now be considered. Assume that a call has been registered above the current position of the elevator and that the stop time has expired. Such a call will close contact U1 at 15 so that an energizing circuit for the up direction relays U and UU is completed from lead 109 through the safeties, door hold button 108, closed contacts TR, DL and U1, coils U and UU, closed interlock contacts DD, all at line 15 and closed stopping contacts HS and door open contacts OPN at line 16. U closes a sealing contact at line 16 to hold the direction relays energized and closes a contact in the high main switch circuit at 39.

Energization of relay UU locks out the down direction relays DD and D by opening a back contact at line 17 and energizes the leveling control and retiring cam relays P and RC at lines 12 and 14 by closing a contact at line 11. It also disables the leveling relays by opening a back contact at line 18 and closes a portion of the up direction switch UP through a contact at 33. When the retiring cam operates, the landing switch 135 closes and since the car gate is fully closed at that moment gate switch 136 is also closed both at 33 to energize up direction switch UP through the circuit from DG supplied lead R, closed back contact DN at 33, contact UU at 33 and the limit switches 135 and 136 to DC supplied lead B.

Up direction switch UP closes its contacts at lines 1 and 2 to connect the circuits for the stator windings of the lifting motor to the line, energize signal control relay SCR and enable the energization of governor relay GV. It partially completes a holding circuit, effective during the slowdown and stopping operations, by closing a contact at line 31, it locks out the down direction switch by opening a back contact at 35, and it partially completes a circuit for high main switch HM at 39.

Brake relay BK at 21 is energized as leveling control relay P closes its contact at line 21 through a circuit from lead 109, the safeties, contact LB at 21, coil BK and contact P at 21 to lead 110. Brake relay BK releases the brake by energizing the brake solenoid (not shown) and energizes high main switch HM at 39 by closing contact BK at 39 to complete a circuit from lead R through coil HM, closed contacts UP, U and BK at 39 to lead B.

High main switch connects the high main windings to the line by closing its contacts at lines 7 and 8. It opens its back contact at line 41 to insure that low main switch LM is locked out, and it closes its contact at line 43 to initiate the timing operations of the high acceleration switches and pilot relays.

First high acceleration pilot relay HT1 is energized at 44 by closure of contacts HM at 43 through the circuit from lead R, resistor 146, coil HT1, condenser 141 to the junction 147 and thence through contact HM at 43 to lead B. Pilot relay HT1 operates rapidly to open back contact HT1 at 43 and prevents the pull in of acceleration switch HA1. Contact HM also initiates the operation of auxiliary high main relay HMA at 42. Relay HMA opens its back contact at line 44 with no effect at this time. Condenser 141 begins to charge and transient current flows to it which gradually diminishes. At some point determined by the current required to sustain relay HT1 pulled in and the magnitude of the condenser 141, the transient current drops below the level necessary to hold the relay HT1 and it drops out closing its contact at line 43 to complete an energizing circuit for the first high acceleration switch HA1. HA1 then pulls in closing its contacts at lines 7 and 8 to short out the first step of acceleration resistance 114, 115 and 116, closes its contact at line 44 to energize the high timing unit 150 consisting of HA2 and HT2 and opens its back contact at line 46. HT2 is rapidly energized and is maintained energized by the transient current charging condenser 143 until the transient current falls below the holding value. Again this value can be adjusted by adjustment of the relay and adjustment of the magnitude of condenser 143. When HT2 drops out it closes its back contact at 45 to energize second high acceleration switch HA2. HA2 then pulls in to close its contacts at lines 7 and 8 and shunt out the second step of accelerating resistance in the stator winding.

From the above it is seen that operation of the lifting motor is initiated with the release of the brake, by energization of the stator windings conditioning the motor for a high synchronous speed with a substantial amount of resistance in series with those windings to reduce the torque generated thereby, advantageously of the order of one half of maximum torque, and in timed sequence to reduce the torque limiting resistance in two steps so that the motor torque is increased to permit acceleration of the motor to synchronous speed gradually.

A stop is initiated when the slowdown relay HS is energized to open its back contact at line 16 and deenergize the direction relays U and UU. At this time contact HS at 13 is closed to hold relays P and RC energized when the direction relay contacts UU or DD at 11 or 12 open and contacts HS at 31 and 37 are closed to maintain the direction switches energized around the open direction relay contacts UU at 33 and DD at 36.

The dropout of up direction relay U opens the seal circuit at 16 with no effect and opens the high main switch at 39 to dropout HM. This transfers the motor to the low speed stator windings by closing back contact HM at 41 to energize low main switch LM through lead R, coil LM, closed contacts SRC and HM to lead B. HM also opens its contact at 43 to deenergize high acceleration switches HA1 and HA2. This has no effect on the lifting motor inasmuch as contacts HM at lines 7 and 8 have opened to deenergize the high speed stator windings. However, the deenergization of HA2 opens its contact at line 10 to deenergize governor relay GV and close its back contact at line 18 to enable the leveling relays LB, LU and LD. GV also opens a contact at 14 with no effect inasmuch as contact HS at 13 paralleling the GV contact holds the circuit closed.

With the energization of low main switch LM the motor is switched to the low speed stator windings with a maximum resistance in series therewith by the closure of contacts LM at lines 4 and 5. Thereafter, at intervals the magnitude of the series resistance is reduced to increase the torque of the motor tending to establish the low synchronous speed and thereby dynamically braking the car from the high speed. The first step of resistance is eliminated by the energization of low acceleration switch LA1 at 47. This is accomplished by the closing of contact LM at 47 while the brake is released and the car is running so that contact BK at 47 is closed and that first low acceleration pilot relay LT1 is pulled in virtually immediately.

Relay LT1 opens its contact at 47 in the energizing circuit for LA1 to prevent its operation at this time. The pull in current for relay LT1 is the charging current for condenser 148. As that condenser is charged, the current reduces, ultimately at some predetermined point depending upon the holdin threshold for the relay LT1 and the magnitude of condenser 148, to a level insufficient to hold relay LT1 so that the relay drops closing its contact at 47 to complete the energizing circuit for low acceleration switch LA1. LA1 then pulls in closing its contacts at lines 3 and 4 to short out the resistances 111, 112 and 113 in series with the low stator windings. LA1 also closes a contact at 50 to energize the next timer unit 160 and opens a contact at 52 to interrupt the condenser discharge circuit of that second timer unit.

Upon the expiration of a second interval measured from the operation of first low acceleration switch LA1, second low acceleration switch LA2 is operated to cut out additional resistance in the motor stator. The timing is accomplished as described above by pulling in second low acceleration pilot relay LT2 as contact LA1 at 50 is closed to open the circuit energizing second low acceleration switch LA2. As the transient current through condenser 151 decays it falls below the threshold of holding current for relay LT2 dropping that relay to close its contacts at 51 and complete an energizing circuit for switch LA2. LA2 pulls in closing its contacts at lines 3 and 4 to short out resistors 121, 122 and 123 of the second step of acceleration in the low speed windings and it closes its contact at 53 while opening its contact at 55 to energize the third timed switch. The third low acceleration pilot relay LT3 pulls in due to the transient current in condenser 153 and as that current decays drops out at a predetermined point giving a time delay for the closure of back contact LT3 at 54 in the energizing circuit for third low acceleration switch LA3. That switch upon pulling in closes its contacts at lines 3 and 4 to short out resistances 131, 132 and 133 and leave the minimum resistance in series with the low speed windings of the elevator.

As the resistance in series with the low speed winding is decreased the dynamic braking of that winding is increased and the speed of the car and motor are reduced to the low synchronous speed. In a properly adjusted system the low synchronous speed is attained as the car enters the leveling zone. Advantageously, this is about 18 inches from a position level with the landing. An ascending car when so positioned closes its contact HLU at 18 to energize up leveling relay LU. The leveling unit for the car is shown enclosed in the dashed line rectangle 155 in FIG. I and comprises a group of switches positioned on the car and arranged to be closed when they attain certain positions critically spaced from the landing. LU opens its contact at 12 to deenergize relay P and the retiring cam relay RC. Upon release of the retiring cam the cam is positioned to unlock the landing doors for the car when the car is properly positioned with respect to the landing. The drop of relay P closes back contact P at 20 to enable the energizing circuit for leveling brake relay LB at 20, opens contact P at 21 with no effect inasmuch as LU at 22 remains closed parallel therewith, and opens contact P at lines 31 and 37 to open the seal circuit for the direction switches with no effect at this time since the leveling contact LU is closed to hold switch UP energized at 34.

As the car moves closer to the landing, contacts ULB and DLB of the leveling unit are closed at 20 to energize relay LB and apply the brake by deenergizing relay BK at 21 through the opening of contact LB at 21 and the closing of contact LB at 23 to energize auxiliary leveling relay LA which opens its contact at 24 to deenergize brake timing relay TRB and time the drop of open contact TRB at 22. As the brake is applied the car continues to move due to its inertia.

If the brake is properly adjusted the car will slide only a predetermined distance necessary to bring it level with the landing. When the car is accurately positioned at the landing or within some predetermined limits of true level therewith, as for example, ¾ of an inch above or below, both of contacts HLU and HLD at 18 and 19 are open and contacts ULB and DLB are closed. This drops relay LU to close its contacts at line 12 with no effect inasmuch as the parallel contacts UU, DD, HS and GV are all opened at this time, opens contact LU at 22 to deenergize auxiliary leveling relay LA, opens contacts LU at 34 and closes back contact LU at 34 to deenergize the up direction switch UP. When UP drops out it opens its contacts at lines 1 and 2 to deenergize the stator windings and the relay SCR at 9. SCR opens its contact at 41 to deenergize low main switch LM. Opening of contact LM at 47 resets all of the low acceleration timing switches. Upon closing its contact at 49 LM discharges the condenser 148 through the low resistance 149 thereby rapidly preparing the low acceleration switches to be retimed. Similarly, LA1 closes its back contact at 52 to discharge condenser 151 through the low resistance 152 and LA2 closes its back contact at 55 to discharge the condenser 153 through the low resistor 154.

In the event that the car did not attain a sufficiently level position with respect to the landing to drop out both contacts HLU and HLD of the leveling unit within the timing interval of brake timing relay TRB following the energizing of auxiliary leveling relay LA to open its contact at 24, contact TRB at 22 closes to reenergize brake relay BK through that contact and the contact of the still energized leveling relay LU or LD. This releases the brake to permit releveling. In proper operation the leveling is completed in the interval of TRB, LA drops out to close its contact at 24, TRB is reenergized before it times out, and back contact TRB at 22 remains open.

Releveling is accomplished by energizing the motor through its low speed stator windings so that it moves at the low synchronous speed. Since misalignment with the landing is ordinarily slight under these circumstances, it is desirable to move the car slowly into alignment. Thus the leveling acceleration steps are effected slowly relative to the speed with which they are made during the slowdown operation. This change in the speed of the steps is accomplished through the additional capacitance placed in parallel with the timing capacitors for the first, second and third low acceleration steps. During this releveling operation the capacitance 156 is paralleled with capacitance 148 for the first step through closed contact LA of the auxiliary leveling relay. Thus the charging current flowing through the increased capacitance to hold in relay LT1 flows for a greater interval before it diminishes to a level permitting that relay to drop out and close contact LT1 at 47. The lifting motor is thereby given an opportunity to move the car into a level position with the lowest torque obtainable as determined by the presence of all resistance in series with its stator windings.

In the event that the car is so loaded that the low torque is insufficient to effect the leveling, upon the time out of LT1 first low acceleration switch LA1 is energized to cut out one step of the resistance thereby increasing the torque and the second low acceleration control is energized to initiate its timing cycle. This second cycle is also extended by adding a capacitor 157 in parallel with the capacitor 151 through the closure of auxiliary leveling relay contact LA at 53. Again a substantial interval is required to time out the relay LT2 giving the motor an opportunity to bring the car into the level position with an intermediate amount of torque developed. If the car has not been leveled during that interval LA2 operates to apply the next increased step of torque and to initiate the third timing operation. This third timing operation is also extended over that which is present for normal slow down from high speed operation through the connection of condenser 158 in parallel with condenser 153 by the closure of contact LA at 56.

Releveling is instituted through the direction switches UP and DN. If an up running car overruns the landing at which it is to stop it closes leveling contact HLD at 19 to energize relay LD and close its contact at line 35 to complete an energizing circuit for down direction switch DN through closed contact UP and closed contact LD at 35 and closed contact LU at 34. Conversely, if the car had settled below the level position at the landing the leveling unit contact HLU at 18 would close to energize relay LU and close contact LU at 34 to complete an energizing circuit for up direction switch UP through closed contact DN at 33, closed contact LU at 34 and closed contact LD at 35. Energization of either UP or DN closes the contacts at lines 1 and 2 to energize relays SCR at 9 and close its contacts at line 41. This causes low main switch to pull in closing its contacts at 4 and 5 to energize the low main stator windings closing its contact 47, to energize the low main acceleration controls, and to open its back contact at 49 to open the discharge circuit for condenser 148.

The timing cycle described above is terminated at any time during the releveling that the car is moved to a position wherein both contacts HLU and HLD of the leveling unit are opened at 18 and 19. The direction switch UP or DN is dropped out to disconnect the stator windings to drop relays SCR and LM. Opening of contact LM at 47 and closing of contact LM at 49, LA1 at 52 and LA2 at 55 discharge the several timing condensers through the resistors 149, 152 and 154. Open contacts LU and LD at 22 and 23 reset the brake such that the car is again conditioned to start normally when starting circuits are energized.

Thus the low acceleration controls comprising low acceleration switches, LA1, LA2 and LA3 are pulled in at different given intervals following the energization of low main switch LM depending on the function they are to perform. In a normal deceleration from high synchronous speed to low synchronous speed the low synchronous speed torque is increased in steps occurring at intervals of a fraction of a second each. The low speed stator winding is also employed for releveling the car in case it fails to properly level at the landing when it is stopped. In order to do this the timers are rapidly reset after they have completed their stopping function so that they are conditioned to be reused for releveling. During the releveling operation their intervals are altered by changing the value of the timing condensers through the connection of additional condensers in parallel with the slowdown timing condensers. This reconnection of and change in the magnitude of the condensers alters the low acceleration steps to intervals of the order of a second whereby the motor is initially energized for a low synchronous speed with a low torque and if it fails to relevel in the timing interval during which low torque is applied a second higher torque is applied for a second timing interval. If the car still fails to level a still higher torque is applied and finally full torque is applied following the expiration of a third interval. This enables the car to be gently returned to a level position without overshooting and traveling beyond that position.

Having described the invention, I claim:

1. A control for an elevator having a multi-speed alternating current motor comprising means for connecting said motor for high speed operation in response to a call for service; means for reconnecting said motor from high speed connection to a low speed connection in response to a slowdown signal; means for generating a releveling signal when a car stops more than a given distance from a landing; means for connecting said motor for low speed operation in response to a releveling signal; means for gradually increasing the motor torque upon connection of the motor for high speed operation including a plurality of timed switches for altering the torque developed, a pilot relay for each switch having a normally closed contact in series with said switch, a condenser connected in series with said pilot relay, means to energize said relay and switch circuits with unidirectional current, said relay having a more rapid pull in than its switch and a holding current threshold such that the charging current of said condenser falls below said threshold a given interval after energization, a discharge resistance, means to connect said resistance across said condenser in response to the interruption of said high speed connection; and means for gradually increasing the motor torque upon connection of the motor for low speed operation including a plurality of timed switches for altering the torque developed, a pilot relay for each switch having a normally closed contact in series with said switch, a first condenser connected in series with said pilot relay, means to energize said relay and switch circuits with unidirectional current, said relay having a more rapid pull in than its switch and a holding current threshold such that the charging current of said condenser falls below said threshold a first given interval after energization, a discharge resistance, means to connect said resistance across said condenser in response to the interruption of said low speed connection, and a second condenser connected in parallel with said first condenser in response to a releveling signal, said parallel condensers causing charging current to fall below said threshold a second given interval greater than said first interval after energization.

2. A control for an elevator having an alternating current motor comprising means for gradually altering the motor torque including a plurality of timed switches for altering the motor circuit to alter the torque developed, a pilot relay for each switch having a normally closed contact in series with said switch, a first condenser for each pilot relay connected in series with said pilot relay, means to energize said relay and switch circuits with unidirectional current, said relay having a more rapid pull in than its switch and a holding current threshold such that the charging current of said condenser falls below said threshold a first given interval after energization, a second condenser and means to connect said second condenser in parallel with said first condenser in response to a predetermined signal which is effective upon operation of said energizing means, said parallel condensers causing charging current to fall below said threshold a second given interval greater than said first interval after energization.

3. A control for an elevator having an alternating current motor comprising means for gradually altering the motor torque including a plurality of timed switches for altering the motor circuit to alter the torque developed, a pilot relay for each switch having a normally closed contact in series with said switch, a first condenser for each pilot relay connected in series with said pilot relay, means to energize said relay and switch circuits with unidirectional current, said relay having a more rapid pull in than its switch and a holding current threshold such that the charging current of said condenser falls below said threshold a first given interval after energization.

4. A control for an elevator having an alternating current motor comprising means for gradually altering the motor torque including a plurality of timed switches for altering the motor circuit to alter the torque developed, a pilot relay for each switch having a normally closed contact in series with said switch, a first condenser for each pilot relay connected in series with said pilot relay, means to energize said relay circuit with unidirectional current to prevent energization of said switch, said condenser and said relay being so proportioned that the charging current of said condenser falls below the holding current threshold of said relay a first given interval after energization of the relay circuit to energize said switch.

5. A control for an elevator having an alternating current motor comprising means for gradually altering the motor torque including a plurality of timed switches for altering the motor circuit to alter the torque developed, a pilot relay for each switch having a normally closed circuit contact in series with said switch, a first condenser for each pilot relay connected in series with said pilot relay, means to energize said relay circuit with unidirectional current to prevent energization of said switch, said condenser and said relay being so proportioned that the charging current of said condenser falls below the hold-in current threshold of said relay a first given interval after energization of the relay circuit, a second condenser and means to connect said second condenser in parallel with said first condenser in response to a predetermined signal which is effective when said energizing means is operated.

6. A control for an elevator having a alternating current motor comprising means for gradually altering the motor torque including a plurality of successively timed switches for altering the motor circuit to alter the torque developed, a pilot relay for each switch having a normally closed contact in series with said switch, a first condenser for each pilot relay connected in series with said pilot relay, means to energize said relay and switch circuits pilot relay, means to energize said relay and switch circuits with unidirectional current, said relay having a more rapid pull in than its switch and a holding current threshold such that the charging current of said condenser falls below said threshold a first given interval after energization to complete the switch circuit, means responsive to operation of a first timing switch for initiating energization of a pilot relay of a second timing switch, a second condenser for each pilot relay and means to connect said second condenser in parallel with said first condenser in response to a predetermined signal which is effective upon operation of said energizing means, said parallel condensers causing charging current to fall below said threshold a second given interval greater than said first interval after energization.

7. A control for a multi-speed alternating current elevator lifting motor of the squirrel cage type having a high speed and a low speed stator winding comprising resistance in series with each winding, means to render said high speed winding effective on starting and said low speed winding effective during stopping and means to reduce the resistance in series with the effective winding progressively at timed intervals upon the initiation of the motor starting and the stopping operations comprising, a unidirectional source of energy, a first relay, an energizing circuit from said source for said first relay, a capacitor in said energizing circuit, and means to complete said energizing circuit during said operation, said condenser and said relay being so proportioned that the charging current to said condenser through said relay falls below the hold in level of said relay a given interval after the circuit is energized and means responsive to the operation of said relay at the end of said given interval for reducing the resistance in series with the effective windings.

8. A control for a multi-speed alternating current elevator lifting motor of the squirrel cage type having a high speed and a low speed stator winding comprising resistance in series with each winding, means to render said high speed winding effective on starting and said low speed winding effective during stopping and means to reduce progressively the resistance in series with the effective winding at timed intervals during the starting and stopping operations of the motor comprising a source of unidirectional current, a first relay, an energizing circuit from said source for said first relay, a capacitance for said first relay, means to complete said energizing circuit for said relay through said capacitance during said operation to first energize and then drop out said first relay a given interval after energization, means for reducing the resistance in series with the effective winding upon drop out of said first relay, a second relay, a second capacitance for said second relay, means responsive to the drop out of said first relay for initiating energization of said second relay through said second capacitance whereby said second relay is pulled in and then dropped out a given second interval thereafter and means for further reducing the resistance in series with the effective winding upon drop out of said second relay.

9. A control for a multi-speed alternating current elevator lifting motor of the squirrel cage type having a high speed and a low speed stator winding comprising resistance in series with each winding, means to render said high speed winding effective during normal running of the car and said low speed winding effective during stopping of the car and releveling of the car, means to generate a releveling signal when a car stops more than a given distance from a landing and means to reduce progressively the resistance in series with the low speed winding at timed intervals upon the initiation of the stopping operation and during a releveling operation comprising a source of unidirectional current, a first relay, an energizing circuit from said source for said first relay, a capacitance, means to complete said energizing circuit through said capacitance and said relay during the initial period of connection of said low speed winding, said condenser and said first relay being so proportioned that the charging current to said condenser through said relay falls below the hold in level of said relay a given interval after its circuit is energized, means responsive to the drop out of said relay for reducing the level of resistance in said low speed winding, a second condenser for said first relay, means to connect said second condenser in parallel with said first condenser in response to a releveling signal, said parallel first and second condensers and said first relay being so proportioned that the charging current to said condensers and through said relay falls below the hold in level of said relay an interval longer than said first given interval after the circuit is energized, a second relay, a third condenser, means to energize said second relay from said source through said third condenser in response to the drop out of said first relay and means to further reduce the resistance in series with the low speed winding upon the drop out of said second relay.

No references cited.

UNITED STATES PATENT OFFICE
CERTIFICATE OF CORRECTION

Patent No. 3,011,594                                December 5, 1961

Joseph H. Borden

It is hereby certified that error appears in the above numbered patent requiring correction and that the said Letters Patent should read as corrected below.

Column 2, line 60, for "at", second occurrence, read -- as --; column 6, line 28, for "DG" read -- DC --; column 8, line 8, for "contacts" read -- contact --; column 12, line 9, strike out "relay, means to energize said relay and switch circuits --.

Signed and sealed this 15th day of May 1962.

(SEAL)
Attest:

ERNEST W. SWIDER                                    DAVID L. LADD
Attesting Officer                                        Commissioner of Patents